United States Patent [19]

Snyder

[11] Patent Number: 5,063,969

[45] Date of Patent: Nov. 12, 1991

[54] SELF-ERECTING SPIRAL METAL TUBE WITH ONE TEXTURED SIDE

[75] Inventor: Kenneth J. Snyder, Perkasie, Pa.

[73] Assignee: Ametek, Inc., New York, N.Y.

[21] Appl. No.: 485,965

[22] Filed: Feb. 27, 1990

[51] Int. Cl.⁵ ................................. F16L 9/16
[52] U.S. Cl. ..................... 138/154; 138/129; 138/134; 138/145; 138/150
[58] Field of Search ............... 138/134, 150, 145, 154, 138/129, 118, 119; 267/204, 214

[56] References Cited

U.S. PATENT DOCUMENTS

| | | | |
|---|---|---|---|
| 3,007,239 | 11/1961 | Lermont | 29/173 |
| 3,448,939 | 6/1969 | Bieber | 242/54 |
| 3,467,329 | 9/1969 | Giltner | 242/54 |
| 3,587,658 | 6/1971 | Giltner | 138/154 |
| 3,635,156 | 1/1972 | Krebs et al. | 101/93 C |
| 3,743,267 | 7/1973 | Guerster et al. | 267/74 |
| 3,860,041 | 1/1975 | Leiter | 138/144 |
| 3,863,405 | 2/1975 | Leiter | 52/108 |
| 3,888,283 | 6/1975 | Cauffiel | 138/150 |
| 4,869,704 | 9/1989 | Fisher | 446/486 |

Primary Examiner—Paul T. Sewell
Assistant Examiner—Thomas P. Hilliard
Attorney, Agent, or Firm—John F. A. Earley; John F. A. Earley, III

[57] ABSTRACT

A self-erecting, coiled metal tube comprises a helically wound ribbon of spring material having an inside surface and an outside surface, the ribbon having adjacent turns stressed to coil in tight overlapping and telescoping engagement, and a textured surface formed on the outside surface of the ribbon so that when the ribbon is extended, the textured surface of an underlapped turn of ribbon bears against the inner surface of an overlapped turn of ribbon to create friction between the adjacent turns of ribbon and control the length of extension of the ribbon tube and strengthen the tube.

16 Claims, 2 Drawing Sheets

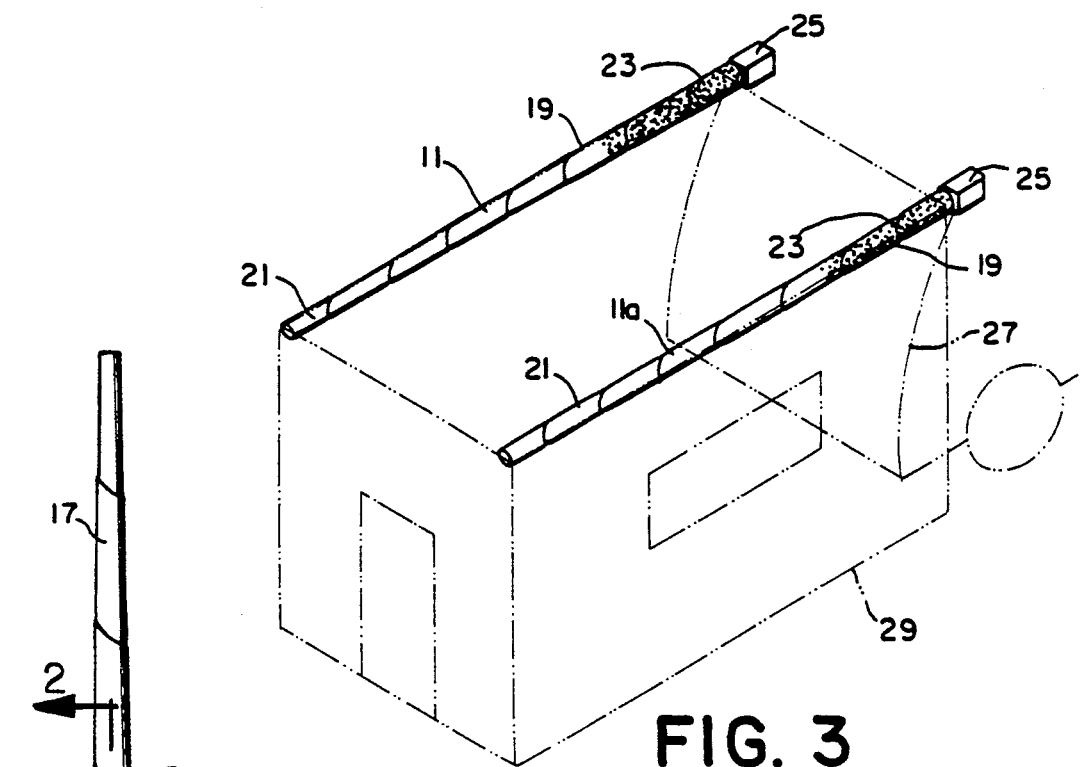
FIG. 3
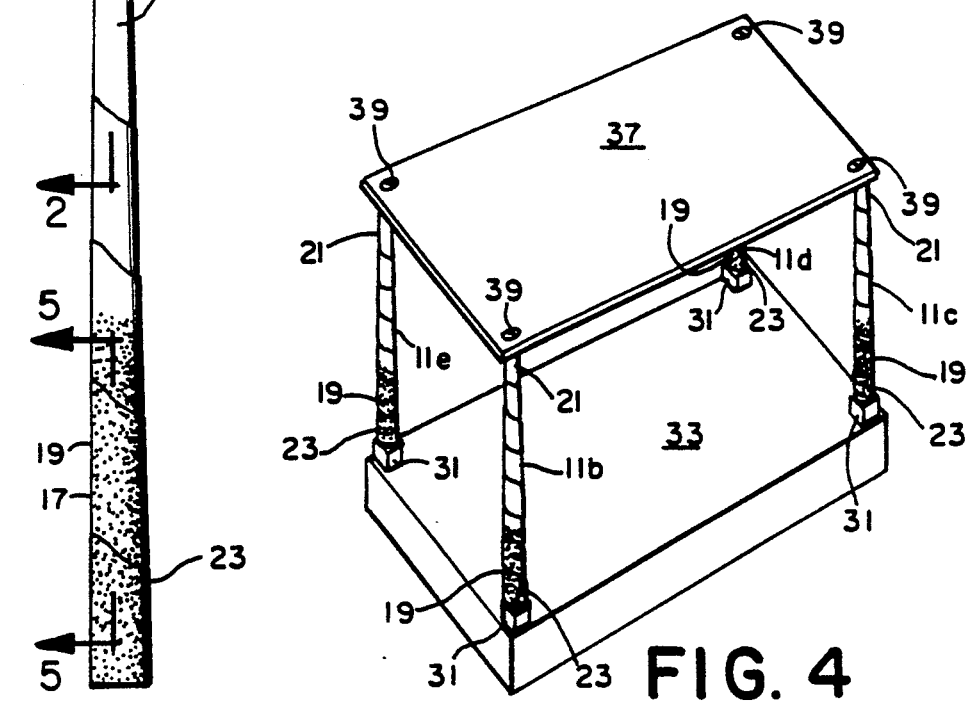
FIG. 1
FIG. 4

SELF-ERECTING SPIRAL METAL TUBE WITH ONE TEXTURED SIDE

BACKGROUND OF THE INVENTION

1. Field of the Invention

This invention relates to self-erecting, coiled metal tubes, and more specifically concerns self-erecting metal tubes that include a helically wound ribbon of spring material having adjacent turns stressed to coil in tight overlapping and telescoping engagement and means for controlling the extension of such tubes.

2. Description of the Prior Art

Conventional self-erecting, coiled metal tubes comprise a helically wound ribbon of spring material, with the ribbon having adjacent turns stressed to coil in tight overlapping and telescoping engagement. Examples of such self-erecting metal tubes are disclosed in U.S. Pat. No. 3,587,658, issued June 28, 1971, to Giltner, for an invention in a SELF-ERECTING SPIRAL TUBE DEVICE, and in U.S. Pat. No. 3,860,041, issued Jan. 14, 1975, to Leiter for an invention in a SELF-ERECTING TUBE, which are both owned by the Assignee of the present invention, and which are both incorporated herein by reference.

Self-erecting, coiled metal tubes have the advantage over seamless tubes of exhibiting substantially greater stiffness and a markedly higher bending failure load capability for a given thickness of material and a given outside dimension.

Further, a self-erecting, coiled metal tube gives superior performance in axial loading, both in tension or compression, in that it is "fail-safe" since a load greatly in excess of its normal design load does not damage it. A tension load elongates the tube, and a compressive axial load compresses the tube. Removal of the excess load permits the coiled tube to restore itself to normal length and normal load-bearing performance.

Further, the coiled tube is advantageous in that it may be compressed in a very small space for storage. When a spring metal is employed, the coiled construction of the tube permits the employment of material having a much higher yield strength than is available in materials used to form seamless tubes; for example, a yield of 260 thousand p.s.i. as against 160 thousand p.s.i.

The self-erecting metal tube is stored in a coiled or compressed state, and, when in the coiled state, contains a large amount of stored energy. The compressed tube is normally attached at its bottom to a base, and is extended by releasing it from its coiled state so that its stored energy forces the tube to expand or extend. The tube expands or extends at a constant rate and reaches its full extension in a very short period of time, usually milliseconds. When the tube is in its extended position, adjacent turns of ribbon overlap to give the extended tube its strength.

A problem with conventional self-erecting metal tubes is that they may overextend when they are expanded so that there is little or no overlap between adjacent turns of the ribbon.

It is conventional to control the length of extension of conventional self-erecting metal tubes by a restraint line, or tether, made of braided nylon or dacron with a diameter of one-thirtysecond to one-eighth of an inch. The tether may also be made from Kevlar man-made fibers or stainless steel braided aircraft cables. Kevlar is a registered trademark of E. I. duPont de Nemours and Company of Wilmington, Del.

The tether may be 20 to 30 feet long, and one end may be attached to the innermost turn of the ribbon which forms the top end of the tube when it is erected, and the other end of the tether may be attached to a base support so that, when the tube is expanded, the extension of the ribbon is limited by the length of the tether which is located inside the tube.

Using a tether presents several problems. One problem is storing the tether. The tether is usually stored by wrapping it around a spool or bobbin which may be mounted on the housing at the bottom of the tube, which adds to the overall size of the self-erecting metal tube package. Self-erecting metal tubes are often used where there is very limited space for storing or using a tether.

Another problem is that when the self-erecting metal tube is repackaged and compressed from its extended position to its original coiled compressed state, the tether must be rewound on the bobbin, which adds to the time it takes to repackage the tube.

Still another problem is that the tether and bobbin add to the manufacturing cost.

It has long been desired to control the extended length of a self-erecting metal tube without using a tether.

SUMMARY OF THE INVENTION

It is an object of the invention to provide a self-erecting, coiled metal tube in which overextension of the tube is prevented by means other than a tether.

Another object of the invention is to provide a self-erecting, coiled metal tube that is easier to erect than conventional self-erecting, coiled metal tubes, and is easier to repackage.

Another object of the invention is to provide a self-erecting, coiled metal tube that is less expensive to manufacture than conventional self-erecting metal tubes.

It is a further object of the invention to provide a self-erecting, coiled metal tube that supports larger lateral and axial loads than conventional self-erecting, coiled metal tubes.

In accordance with these and other objects of the invention, there is shown a self-erecting, coiled metal tube including a helically wound ribbon of spring material having an inside surface and an outside surface, the ribbon having adjacent turns stressed to coil in tight overlapping and telescoping engagement, and a textured surface formed on the outside surface of the ribbon so that as the tube is extended, the textured outside surface of an underlapped turn of ribbon bears against the smooth inside surface of an overlapped turn of ribbon to create friction between the adjacent turns of ribbon and control the length of extension of the ribbon tube.

The textured surface is preferably formed on the lower turns of the ribbon.

The textured surface may be formed on the ribbon by chemically etching the outside surface, by vapor-blasting the outside surface, or by sand-blasting the outside surface.

BRIEF DESCRIPTION OF THE DRAWINGS

FIG. 1 is a view in side elevation of a self-erecting metal tube constructed in accordance with the invention;

FIG. 3 is a view in perspective that shows self-erecting metal tubes constructed in accordance with the invention supporting a lateral load;

FIG. 4 is a view in perspective, partially broken away, that shows self-erecting metal tubes constructed in accordance with the invention supporting an axial load;

DETAILED DESCRIPTION

Figure 2:
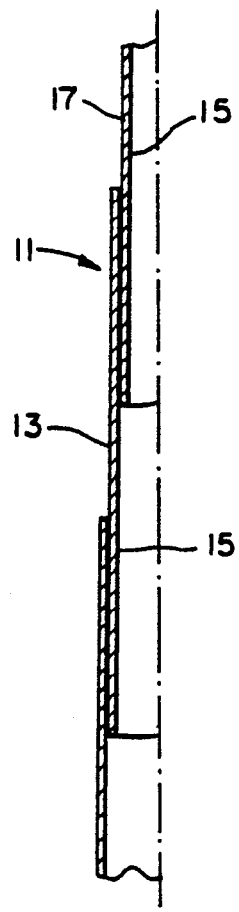
FIG. 2 is an enlarged vertical section, partially broken away, taken as indicated by the lines and arrows 2—2 which appear in FIG. 1 and shows a non-textured portion of the tube.

Turning now to the drawings, there is shown a self-erecting, coiled metal tube 11 comprising a helically wound ribbon 13 of spring material having an inside surface 15 and an outside surface 17, with ribbon 13 having adjacent turns, or laps, stressed to coil in tight overlapping and telescoping engagement, and means for limiting the length that ribbon 13 extends as tube 11 expands from an initial coiled or compressed position to an extended position which include a textured surface 19 formed on outside surface 17 of ribbon 13. When tube 11 is being expanded, textured surface 19 of an underlapping turn of ribbon 13 bears against the smooth inside surface 15 of an overlapping turn of ribbon 13 to create friction between the adjacent turns of ribbon 13, slow the expansion, and control the length of the extension of ribbon 13.

Preferably, the texturizing is performed on the outside surface 17 of those turns of ribbon 13 that comprise approximately the bottom one-fifth of the extended length of tube 11 as shown in FIG. 1. This portion of tube 11 is called the root end 23. However, the texturizing may be performed on more or fewer turns of ribbon 13, depending on how much friction is needed to control the length of the extension of tube 11.

Textured surface 19 may be formed on outside surface 17 of root end 23 of tube 11 by, for example, chemically etching outside surface 17, vapor-blasting outside surface 17, or by mechanical means, such as by shot peening or sand-blasting outside surface 17. The chemical etch may be performed in an acid bath.

Figure 5:
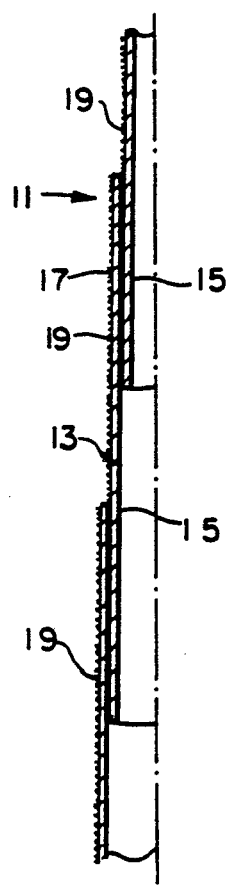
FIG. 5 is an enlarged vertical section, partially broken away, taken as indicated by the lines and arrows 5—5 which appear in FIG. 1 and shows only the exposed portion of the outside surface of the ribbon textured.

When texturizing outside surface 17 of root end 23 of tube 11 with tube 11 in its extended position (FIGS. 1 and 5), only the exposed portions of outside surface 17 of ribbon 13 are textured and the portions of the outside surfaces 17 covered by an overlapped turn are not textured. When a textured tube 11 is being extended from a coiled or compressed position, the textured surface 19 of an underlapped turn of ribbon 13 rubs against the untextured smooth inner surface 15 of an overlapped turn of ribbon 13, and the friction of the textured surface 19 against smooth inside surface 15 controls the length that tube 11 extends.

Even without texturizing, tube 11 expands to a certain length and stops expanding when each coil is grasped sufficiently by its following coil, but the user must be careful that tube 11 does not overexpand and come apart. Each coil wraps tightly around its preceding coil.

Figure 6:
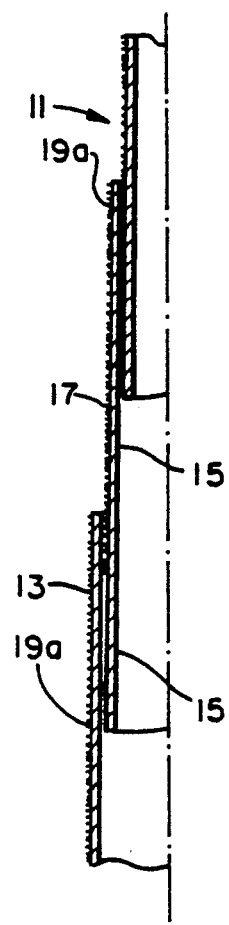
FIG. 6 is the same view as FIG. 5, but of another embodiment of the invention, and shows a ribbon having the outside surface textured so that an overlapping turn of ribbon overlaps part of the textured portion of an underlapping turn of ribbon.

The texturizing may also be performed (FIG. 6) with tube 11 extended past its normal extended position, so that a portion of outside surface 17 greater than the normally exposed portion of outside surface 17 is textured. The additional textured outside surface 17 on root end 23 of tube 11 creates additional friction between the textured surface 19a of an underlapped turn of ribbon 13 and the smooth inner surface 15 of an overlapped turn of ribbon 13 to provide additional control of the length that tube 11 extends.

Figure 7:
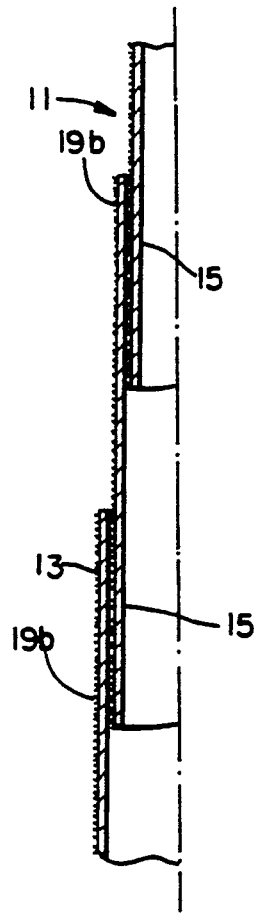
FIG. 7 is the same view as FIG. 5, but of another embodiment of the invention, and shows a ribbon having the entire outside surface of the ribbon textured.

Also, the entire outside surface 17 (FIG. 7) of root end 23 may be textured by extending tube 11 to its normal extended position, texturizing the exposed outside surface 17 of root end 23, and reversing tube 11 and extending it in the reverse direction and texturizing the remaining smooth surface of outside surface 17.

Alternatively, ribbon 13 may be pulled out flat without any overlap, and the entire outside surface 17 may be textured at the same time.

Texturizing the entire outside surface 17 of root end 23 of tube 11 provides the maximum amount of friction between the textured surface 19b of an underlapped turn of ribbon 13 and the smooth inner surface 15 of an overlapped turn of ribbon 13, and therefore provides the maximum amount of control of the extension of tube 11.

Textured surface 19 on root end 23 improves the amount of lateral load and axial load that the tube 11 may support, in addition to controlling the length of extension of tube 11, because textured surface 19 causes the bottom turns of ribbon 13 to overlap to a greater extent than if outside surface 17 were not textured.

Turning to FIG. 3, a pair of tubes 11, 11a having top ends 21 and root ends 23 are secured at the bottom to socket members 25 by riveting root ends 23 of tubes 11,11a into sockets 25. In turn, sockets 25 are secured to the rear of a vehicle body 27. Tubes 11,11a subjected to lateral loading because they support a canvas shelter 29.

Turning now to FIG. 4, tubes 11b–11e constructed in accordance with the invention have root ends 23 secured to socket members 31 mounted on the top of an electronics package 33. The top ends 21 of tubes 11b–11e are secured to a sun shield 37 by machine screws 39 to support the sun shield.

Figure 8:
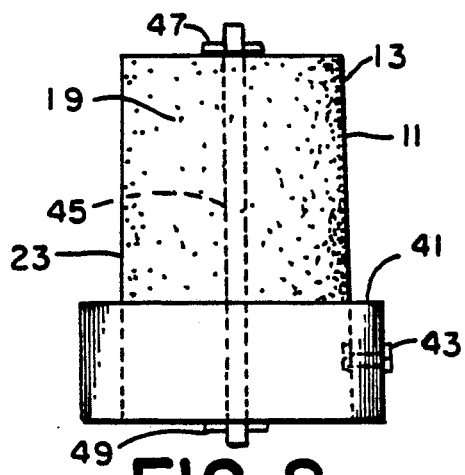
FIG. 8 is a view in side elevation of a self-erecting metal tube in a coiled, or compressed, or stored, position.
Figure 9:
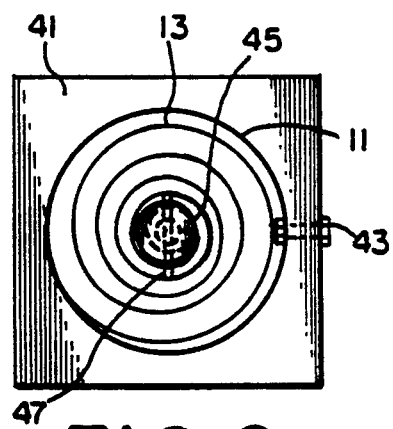
FIG. 9 is a top plan view of the stored, self-erecting metal tube shown in FIG. 8.

Turning now to FIGS. 8 and 9, there is shown a self-erecting, coiled metal tube 11 stored in a coiled or compressed position in a housing 41. Root end 23 of tube 11 is held in housing 41 by a rivet 43 which secures the bottom turn of ribbon 13 to housing 41. Ribbon 13 is typically 0.004 or 0.005 inches thick.

Tube 11 is held in a compressed state around a shaft 45 that extends axially through compressed tube 11 and housing 41, by a pin 47 positioned over the innermost turn of ribbon 13 and secured to shaft 45, and by a pin 49 positioned below housing 41 and secured to shaft 45. Tube 11 is released from its compressed state by removing pin 47 or 49 from shaft 45 and allowing tube 11 to expand.

The texturizing is performed on root end 23 of tube 11 because root end 23 absorbs most of the load when tube 11 extends. As the tube 11 ends its extension, it exerts considerable force on the bottom turn of ribbon 13 and rivet 43 as the expanding tube more or less jerks to a stop. Texturizing root end 23 distributes this ending force, and other bending forces, on tube 11 over several turns of ribbon 13, instead of concentrating the load on the bottom turn of ribbon 13 and rivet 43.

While the invention has been described with the outside surface 17 being texturized and the inside surface 15 being smooth, it is realized that the same effect could be obtained if the reverse were the case, with the outside surface 17 being smooth and the inside surface 15 being texturized, and the claims are to be read in that light.

I claim:

1. A self-erecting, coiled metal tube comprising
a helically wound ribbon of spring material having an inside surface and an outside surface,
the ribbon having adjacent turns stressed to coil in tight overlapping and telescoping engagement, and
means for limiting the extension of the ribbon tube when the ribbon tube expands from an initial coiled position to an extended position,
the extension limiting means including a textured surface formed on one surface of the ribbon and a smoother surface on another surface of the ribbon with the textured surface being rougher than the smoother surface, so that, as the tube is extended, the textured surface of one turn of ribbon bears against the smooth surface of another turn of ribbon to create more friction between the adjacent turns of ribbon than there would be between two smooth surfaces and control the length of extension of the ribbon tube.

2. The self-erecting, coiled metal tube of claim 1, wherein
the textured surface is formed on the lower turns of the ribbon.

3. The self-erecting, coiled metal tube of claim 1, wherein
the textured surface is a chemically etched textured surface formed on the surface of the ribbon by chemical etching.

4. The self-erecting, coiled metal tube of claim 1, wherein
the textured surface is a vapor-blasted textured surface formed on the surface of the ribbon by vapor-blasting.

5. The self-erecting, coiled metal tube of claim 1, wherein
the textured surface is a sand-blasted textured surface formed on the outside surface of the ribbon by sand-blasting.

6. A self-erecting, coiled metal tube, comprising
a helically wound ribbon of spring material having an inside surface and an outside surface,
the ribbon having adjacent turns stressed to coil in tight overlapping and telescoping engagement, and
means for limiting the extension of the ribbon tube when the ribbon tube expands from an initial coiled position to an extended position,
the extension limiting means including a textured surface formed on the outside surface of the ribbon and a smoother surface on another surface of the ribbon with the textured surface being rougher than the smoother surface, so that, as the tube is extended, the textured surface of an underlapped turn of ribbon bears against the smooth inside surface of an overlapped turn of ribbon to create more friction between the adjacent turns of ribbon than there would be between two smooth surfaces and control the length of extension of the ribbon tube,
the textured surface being formed on the lower turns of ribbon,
the textured surface being a chemically etched textured surface formed on the outside surface of the ribbon by chemically etching the outside surface.

7. A method of constructing a self-erecting metal tube comprising the steps of
providing a helically wound ribbon of spring material having an inside smooth surface and an outside smooth surface,
stressing the ribbon to form adjacent turns coiled in tight overlapping and telescoping engagement, and
texturizing the outside surface of the ribbon to make it rougher than the smooth inside surface so that when the ribbon tube is extended, the textured surface of an underlapped turn of ribbon bears against the smooth inside surface of an overlapped turn of ribbon to create friction between the adjacent turns of ribbon and control the length of extension of the ribbon tube.

8. The method of claim 7, including
texturizing only the lower turns of ribbon.

9. The method of claim 7, including texturizing the outside surface of the ribbon by chemically etching it.

10. The method of claim 7, including
texturizing the outside surface of the ribbon by vapor-blasting it.

11. The method of claim 7, including
texturizing the outside surface of the ribbon by sand-blasting it.

12. The method of claim 7, further comprising
extending the tube to its extended position having overlapping turns of ribbon before texturizing the exposed outside surface of the ribbon, and
texturizing only the portion of outside surface that is not overlapped by a lower overlapped turn of ribbon.

13. The method of claim 7, further comprising
extending the tube past its normal extended position before texturizing the exposed outside surface of the ribbon, and
texturizing only the portion of outside surface that is not overlapped.

14. The method of claim 7, further comprising
extending the tube to its extended position and texturizing the exposed outside surface of the ribbon, and
then extending the tube in a reverse direction to expose all of the untexturized surface and texturizing the outside exposed surface of the ribbon so that the entire outside surface of the ribbon is textured.

15. The method of claim 7, including
flattening the ribbon, and
texturizing the outside surface while the ribbon is flat before winding it into a coil.

16. A method of controlling the length that a self-erecting metal tube extends, comprising
providing a helically wound ribbon of spring material having an inside surface and an outside surface, the ribbon having adjacent turns stressed to coil in tight overlapping and telescoping engagement, texturizing the outside surface of the ribbon so that it is rougher than the non-texturized surface of the ribbon, and when the ribbon tube is extended, the textured surface of an underlapped turn of ribbon bears against the smooth inside surface of an overlapped turn of ribbon to create friction between the texturized surfaces and smoother surfaces of adjacent turns of ribbon and control the length of extension of the ribbon tube, holding the tube in tightly wound, compressed condition, releasing the tube so that the tube self-erects, and preventing the tube from overextending by creating friction between the outer texturized surface of an underlapped turn of ribbon and the inner surface of an overlapped turn of ribbon.

* * * * *